United States Patent [19]

Yamamoto

[11] 4,353,456

[45] Oct. 12, 1982

[54] CAPSULE ORIENTATION CONTROL METHOD AND APPARATUS

[75] Inventor: Taizo Yamamoto, Osaka, Japan

[73] Assignee: Nippon Elanco Kabushiki Kaisha, Osaka, Japan

[21] Appl. No.: 143,020

[22] Filed: Apr. 23, 1980

[30] Foreign Application Priority Data

Apr. 27, 1979 [JP] Japan .................................. 54-53033

Jun. 28, 1979 [JP] Japan .................................. 54-82843

[51] Int. Cl.$^{3}$ ............................................ B65G 47/24

[52] U.S. Cl. ...................................... 198/397; 101/40; 198/384; 198/393; 198/400

[58] Field of Search ............... 198/384, 393, 396, 397, 198/398, 399, 400; 221/156, 157, 171, 172, 173; 101/40, 426

[56] References Cited

U.S. PATENT DOCUMENTS

| | | | |
|---|---|---|---|
| 2,785,786 | 3/1957 | Bartlett | 198/398 |
| 3,871,295 | 3/1975 | Ackley | 101/40 X |
| 3,933,239 | 1/1976 | Yoshida | 221/173 X |
| 4,104,966 | 8/1978 | Ackley, Jr. et al. | 198/393 X |
| 4,266,477 | 5/1981 | Ackley | 198/384 X |
| 4,266,478 | 5/1981 | Ackley | 101/40 |

*Primary Examiner*—Jeffrey V. Nase

*Attorney, Agent, or Firm*—Birch, Stewart, Kolasch & Birch

[57] ABSTRACT

A capsule orientation control method and an apparatus for effecting the method are disclosed. The method includes the steps of receiving and holding the capsules from a supply hopper in such a manner that the axes of the capsules are aligned with the radial direction of a rotary drum and that it can be visually and spatially identified whether the capsules are stably held in capsule accommodating pockets with the caps thereof radially outwardly orientated in an erect posture or radially inwardly orientated in an inverted posture through action of rotary brush means rotatably provided in a position adjacent to a portion of the rotary drum where the capsules are received onto the rotary drum from the supply hopper, and causing the capsules in the inverted posture to fall down within the capsule accommodating pockets in a predetermined direction so as to align positions of the caps thereof with positions of the caps of the capsules in the erect posture before removing the capsules.

25 Claims, 14 Drawing Figures

CAPSULE ORIENTATION CONTROL METHOD AND APPARATUS

BACKGROUND OF THE INVENTION

The present invention generally relates to a capsule orientation control and more particularly, to a method of controlling orientation or attitude of a plurality of capsules in a predetermined orientation and an apparatus employed therefor.

As is generally known, for example, in the gelatin hard capsules for use in the pharmaceutical industry each composed of a cylindrical open-ended body and a cap similar in shape to the body and applied onto the body with the open end of said body inserted into said cap, the cap and body are formed separately by dip molding so as to be mechanically combined thereafter into one unit for subsequent visual examination, while the peripheral surface thereof (normally, the peripheral surface of the cap) is further imprinted, if necessary, with proper indications such as article codes, names of pharmaceutical companies, etc. The capsules thus prepared are first supplied to a pharmaceutical company where a predetermined dose of an oral medicine and the like is enclosed in each of the empty capsules, and after another visual examination, are packed in a suitable package such as a blistered package or the like for delivery to general markets. In connection with the above, for filling the empty capsules as described above with contents such as the doses of the medicine, it is absolutely necessary to align in advance the capsule attitude in a predetermined direction with respect to the transporting direction, i.e. to effect the orientation control for adapting the capsules to a filling machine. Meanwhile, although not essential at all times, similar orientation control to the above is also effected prior to the visual examination, printing and packing of the capsules for facilitation of the examination, neatness of the printed indications, and further, good style of final packages, etc.

Incidentally, the orientation control of capsules is broadly divided into two practices, i.e. one in which axes of the capsules are adapted to lie along, i.e. to be directed in a direction parallel to the direction of transportation of the capsules, and the other in which the axes thereof are caused to intersect at right angles with said direction of transportation.

Conventionally, owing to reasons such as ease in—therefor the orientation control or simple construction of the apparatus required for the orientation control, etc., the former practice in which the axes of the capsules are aligned with the direction of the transportation, with the caps (or bodies) of the capsules all directed forwards or backwards, has been widely employed. While the former orientation control method as described above fully meets the purposes of visual examination, and printing and filling of the contents, it is not applicable to the so-called "spin" printing which has recently been put into practical application and in which printing is effected along the cylindrical outer peripheries of the capsules (normally of the cap sides). For effectively carrying out the "spin" printing as described above, it is required to preliminarily align the capsules with their axes intersecting at right angles with the direction of transportion of the capsules as in the latter practice. Meanwhile, the conventional capsule orientation control apparatuses employed for the former practice in which the axes of the capsules are aligned with the direction of transportation of the capsules for directing all the caps thereof forwards or backwards in the above state, still have such disadvantages in that they are complicated in construction or rather unreliable in function.

In connection with the above, there has conventionally been proposed one method in which axes of capsules are adapted to intersect at right angles with the direction of transportation thereof, for example, in Japanese Patent Publication Tokkosho No. 53-12239 (corresponding to U.S. Pat. No. 3,871,295 to Ackley entitled "Capsule orienting apparatus and method of spin printing"). Although the invention disclosed in said Japanese Patent Publication relates to a method of orientation, rotation and printing of capsules and an apparatus employed therefor, the features thereof rather reside in the capsule orientation control method and apparatus employed therefor for effecting the "spin" printing described earlier.

More specifically, the known arrangement as described above comprises in short:

(i) a rotary drum having, in its peripheral surface, a large number of capsule housing pockets each composed of three recesses or dints respectively formed in a radial direction, the circumferential direction and axial direction of said rotary drum to constitute said capsule housing pocket, and (ii) attitude correcting means including two air jetting devices for directing air jet in a predetermined direction provided adjacent to the rotary drum, and a spacer stopper plate having a slit of a predetermined width.

The functions of the prior art apparatus as described above are as follows.

(i) The pharmaceutical capsules each composed of the cap and body combined as one unit and accommodated at random in the orientation within a hopper are first received and held in the radial directed pockets of the rotary drum so that the axes thereof are directed in the radial direction of the rotary drum, with the caps thereof radially outwardly orientated in the erect posture or radially inwardly orientated in the inverted posture.

(ii) At the time point where the capsules thus held on the rotary drum have been transported a predetermined distance in the circumferential direction by the rotary drum following rotation thereof, the air jet in the direction of transportation is directed to the upper portions of the capsules slantwise from above said capsules.

(iii) In the above case, by the selecting action of the spacer stopper plate, only the capsules held in the inverted posture in the above item (i) are caused to fall down in the direction of transportation, i.e. in the circumferential direction of the rotary drum so as to position the cap portions thereof at the upper portions of the radial direction pockets for bringing said cap portions into substantially the same position as those of the capsules in the erect posture in the above item (i).

(iv) Under the above state, a second air jet is further directed to the cap portions of the respective capsules from the axial direction of the rotary drum for rotating all the capsules in a direction in which axes of the capsules intersect at right angles with the direction of transportation so as to align the cap portions thereof in the same direction.

(v) Subsequently, the respective capsules are taken out as they are in the posture of the above item (iv).

Although the prior art capsule orientation control apparatus in Japanese Patent Publication Tokkosho No. 53-12239 having the construction and functions as described in the foregoing, is only one arrangement in which the capsules are directed to intersect at right angles with the direction of transportation for the orientation control, the known apparatus has disadvantages as described hereinbelow.

(1) Since the capsule housing pockets provided on the rotary drum each includes the recesses formed in three directions of the rotary drum as described earlier, not only the processing thereof is troublesome, but the capsule treating capacity of the apparatus is not sufficiently large, since the number of said pockets per unit area of the rotary drum is limited.

(2) The attitude correction carried out by the indirect means utilizing the air jets is rather unstable in its function, and the reliability thereof tends to be markedly reduced following high speed operation of said apparatus.

(3) Especially, since the initial attitude correction is effected through the spacer stopper plate by the jetting of air stream, the function thereof is apt to be uncertain.

(4) The air jetting devices of two systems are required for the attitude correction, while each of the air jetting devices has to be provided with jetting ports corresponding in number to the number of rows of said pockets of the rotary drum, and thus, the overall mechanism of the apparatus is undesirably complicated.

(5) By the reasons as described in the above items (1) to (4), the prior art apparatus is rather unsatisfactory both in terms of accuracy and capsule treating capacity.

Similarly, the conventional capsule orientation control apparatuses in which the axes of capsules are arranged to lie along the direction of the transportation thereof also have disadvantages in that the construction thereof is still complicated and the function thereof rather unstable.

BACKGROUND OF THE INVENTION

Accordingly, an essential object of the present invention is to provide an improved method of controlling orientation of a plurality of capsules and an apparatus therefor which are capable of carrying out the orientation control of capsules in an efficient manner with stable function, high accuracy and superior capsule treating capacity through simple construction of the apparatus, with substantial elimination of the disadvantages inherent in the conventional capsule orientation control methods and apparatuses.

Another important object of the present invention is to provide an orientation control method and an apparatus employed therefor as described above in which axes of the capsules are adapted to intersect at right angles with the direction of transportation of said capsules.

A further object of the present invention is to provide an orientation control method and an apparatus employed therefor as described above in which axes of the capsules are adapted to lie along or to be directed in parallel to the direction of transportation of said capsules.

In accomplishing these and other objects, according to one preferred embodiment of the present invention, there is provided a method of controlling orientation of a plurality of capsules accommodated in any arbitrary posture in a supply hopper having its bottom portion opened, and each composed of a substantially cylindrical body and a substantially cylindrical cap which is mounted on the body so as to overlap one end portion of the body to define a capsule chamber, by causing the capsules to be individually and successively received in a plurality of radially inwardly extending capsule accommodating pockets which are formed in a rotary drum supported substantially below the bottom portion of the supply hopper for rotation in one direction and which are spaced from each other at equal intervals around the periphery of the rotary drum so as to transport the capsules accommodated in the capsule accommodating pockets through rotation of the rotary drum in a circumferential direction thereof for directing the capsules in a predetermined posture during the transportation thereof. The method includes the steps of:

receiving and holding the capsules from the supply hopper in such a manner that axes of the capsules are aligned with the radial direction of the rotary drum and such that it can be visually and spatially identified whether the capsules are stably held in the capsule accommodating pockets with the caps thereof radially outwardly orientated in an erect posture or radially inwardly orientated in an inverted posture through action of a rotary brush means rotatably provided in a position adjacent to a portion of said rotary drum where the capsules are received onto the rotary drum from the supply hopper, causing the capsules in the inverted posture to fall down in a direction in which the axes of the capsules intersect at right angles with the direction of the transportation of the capsules within the capsule accommodating pockets during the transportation thereof, individually passing from the rotary drum on to a transfer roller, the capsules in the erect posture and those in the once inverted posture and now in the posture of having fallen down in the direction intersecting at right angles with the direction of transportation of the capsules, with the transfer roller being supported adjacent the rotary drum for rotation in the opposite direction with respect to the rotational direction of the rotary drum and having a plurality of radially inwardly extending capsule receiving pockets which are spaced from each other at equal intervals around the periphery of the transfer roller for acommodating therein the capsules in said postures so as to transport said capsules in the circumferential direction of the transfer roller through rotation of the transfer roller, causing the capsules once in the erect posture and now, after transfer to the transfer roll, in an inverted posture to fall down for alignment with the orientation of the capsules which have already fallen down, within the capsule receiving pockets of the transfer roller during transportation of the capsules, and removing from the transfer roller, the respective capsules in the posture intersecting at right angles with the direction of the transportation thereof.

The present invention also provides a capsule orientation control apparatus to be employed for effecting the above described method so as to efficiently direct to a predetermined posture, a plurality of capsules each composed of a cylindrical body and a cylindrical cap which is mounted on the body to overlap one end portion of the body for defining a capsule chamber. The capsule orientation apparatus includes:

a supply hopper for accommodating therein the capsules in any arbitrary posture and having an opening at the bottom portion thereof, a rotary drum rotatably supported below the opening at the bottom portion of the supply hopper for rotation in one direction and having a plurality of radially inwardly extending capsule accommodating pockets which are spaced from each other at equal intervals around the periphery of the rotary drum, with the capsule accommodating pockets being arranged to receive and hold the capsules from said supply hopper in such a manner that the axes of the capsules are aligned with the radial direction of the rotary drum and that it can be visually and spatially identified whether the capsules are stably held in the capsule accommodating pockets with the caps thereof radially outwardly orientated in an erect posture or radially inwardly orientated in an inverted posture, rotary brush means provided in a position adjacent to a portion of the rotary drum where the capsules are received onto the rotary drum from the supply hopper for positively accommodating the capsules into the capsule accommodating pockets and for preventing clogging of the capsules, a transfer roller capable of individually receiving from the rotary drum, the capsules in an erect posture and those once in the inverted posture and now in a posture of having fallen down in the direction intersecting at right angles with the direction of transportation of the capsules, with the transfer roller being supported adjacent the rotary drum for rotation in the opposite direction with respect to the rotational direction of the rotary drum and having a plurality of radially inwardly extending capsule receiving pockets which are spaced from each other at equal intervals around the periphery of said transfer roller for accommodating therein the capsules in said postures so as to transport said capsules in the circumferential direction of the transfer roller, and an attitude altering mechanism capable of forcibly causing the capsules in the inverted posture in the respective pockets to fall down in the direction intersecting at right angles with the direction of the transportation thereof in the course of the transportation of the capsules following rotation of the rotary drum and transfer roller.

The present invention further provides in the modifications thereof, a capsule orientation control method and an apparatus employed therefor in which axes of the capsules are adapted to lie along or to be directed in parallel to the direction of transportation of said capsules.

By the arrangements according to the present invention as described above, the improved method of controlling orientation of a plurality of capsules and an apparatus employed therefor which can efficiently effect the capsule orientation control with stable function, high reliability and superior capsule treating capacity, have advantageously been presented by the apparatus of simple construction.

GENERAL DESCRIPTION OF DRAWINGS

These and other objects and features of the present invention will become apparent from the following description taken in conjunction with the preferred embodiments thereof with reference to the accompanying drawings, in which;

FIG. 1 is a schematic side elevational view showing main portions of a capsule orientation control apparatus according to one preferred embodiment of the present invention, FIG. 2 is a fragmentary top plan view of a rotary drum employed in the arrangement of FIG. 1 and as viewed in the directions of the arrows II—II in FIG. 1, FIG. 3 is a fragmentary sectional view taken along the line III—III in FIG. 1, FIG. 4 is a fragmentary sectional view taken along the line IV—IV in FIG. 1, FIG. 5 is a fragmentary sectional view taken along the line V—V in FIG. 1, FIG. 6 is a fragmentary sectional view taken along the line VI—VI in FIG. 1, FIG. 7 is a fragmentary top plan view of the rotary drum as viewed in the direction of the arrows VII—VII in FIG. 1, FIG. 8 is a fragmentary sectional view taken along the line VIII—VIII in FIG. 1, FIG. 9 is a fragmentary top plan view of a transfer roller employed in the arrangement of FIG. 1 and as viewed in the direction of the arrows IX—IX in FIG. 1, FIG. 10 is a view similar to FIG. 1, which particularly shows a modification thereof, FIG. 11 is a fragmentary view showing on an enlarged scale, a portion encircled by a chain line in FIG. 10, FIG. 12 is a fragmentary sectional view taken along the line XII—XII of FIG. 10, FIG. 13 is a fragmentary sectional view taken along the line XIII—XIII of FIG. 10, and FIG. 14 is a fragmentary side elevational view showing a further modification of the arrangement of FIG. 10.

Before the description of the present invention proceeds, it is to be noted that like parts are designated by like reference numerals throughout several views of the accompanying drawings.

In the first place, terms employed in the present specification will be defined as follows for better understanding of the present invention.

(a) The term "capsule" used in the present specification means, for example, a hard capsule of gelatin for use in the pharmaceutical industry each composed of a cylindrical open-ended body or container and a cap similar in shape to the body and applied onto the body with the open end of the body inserted into the cap. The cap and body are formed separately by dip molding so as to be combined thereafter into one unit. Unless otherwise stated, the term "capsule" includes the empty capsule before filling with the contents or the capsule which has been filled with such contents.

(b) The term "orientation control" means to cause a plurality of the capsules as described above and accommodated at random in the posture in a supply hopper or the like to fall down or lie down in a direction in which the axes of the capsules intersect at right angles with or in a direction in which the axes of the capsules are directed in parallel with, i.e. to lie along the direction of transportation of the capsules so as to align, in the above state, either the cap sides or container sides of all the capsules in a predetermined one direction.

(c) The term "erect posture of the capsule" means the state in which the axes of the capsules are aligned with the radial direction of a rotary drum or a transfer roller, with the cap sides of the capsules radially outwardly orientated with respect to the peripheral surface of the rotary drum or transfer roller.

(d) The term "inverted posture of the capsule" means the state in which the axes of the capsules are aligned with the radial direction of the rotary drum or transfer roller, with the cap side of the capsules radially inwardly orientated towards the center of the rotary drum or transfer roller.

DETAILED DESCRIPTION OF THE INVENTION

Figure 1:
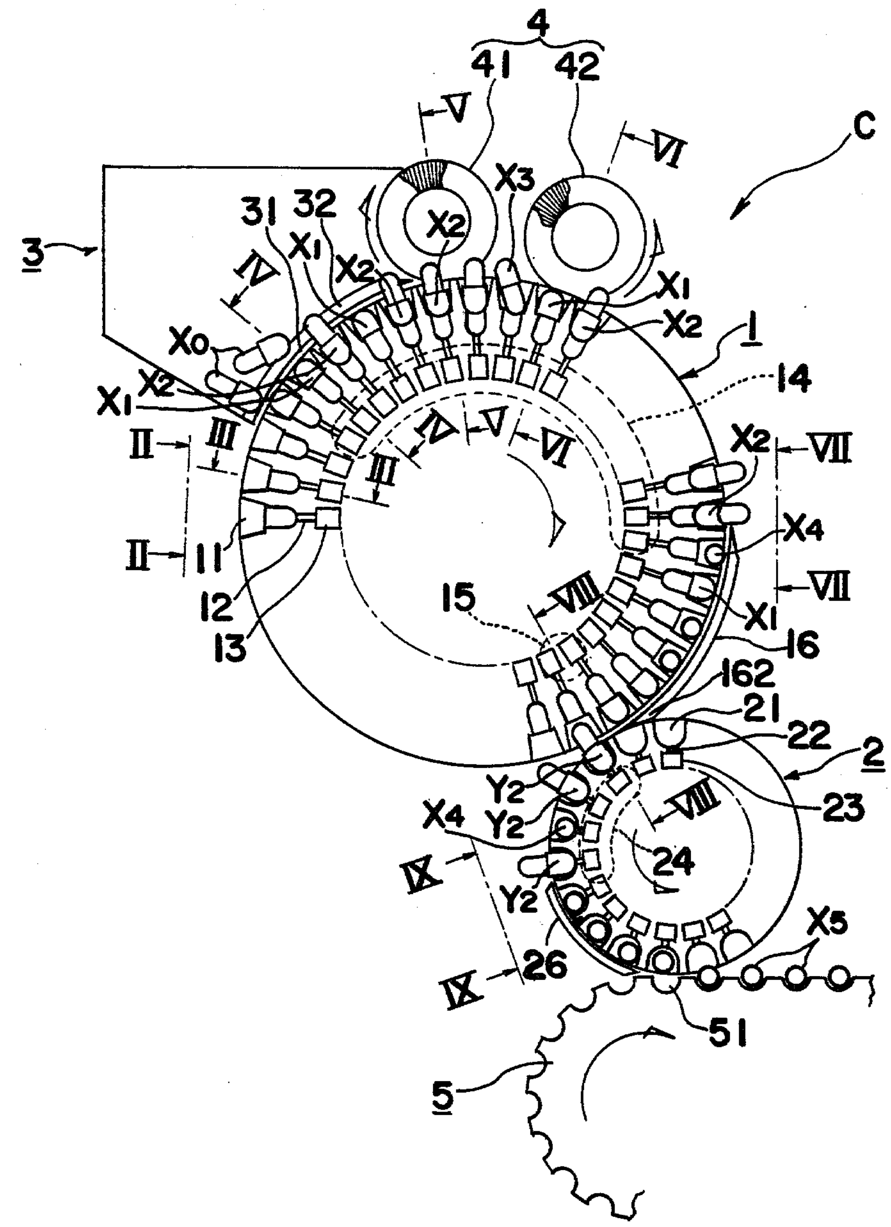

The first invention according to the present invention relates to a method of controlling orientation of a plurality of capsules.

More specifically, the present invention provides a method of controlling orientation of a plurality of capsules accommodated in any arbitrary posture in a supply hopper having its bottom portion opened, and each composed of a substantially cylindrical body and a substantially cylindrical cap which is mounted on the body so as to overlap one end portion of said body to define a capsule chamber, by causing said capsules to be individually and successively received in a plurality of radially inwardly extending capsule accommodating pockets which are formed in a rotary drum supported substantially below said bottom portion of said supply hopper for rotation in one direction and which are spaced from each other at equal intervals around the periphery of said rotary drum so as to transport the capsules accommodated in said capsule accommodating pockets through rotation of the rotary drum in a circumferential direction of said rotary drum for directing the capsules in a predetermined posture during the transportation thereof. The method as described above includes the steps of:

receiving and holding the capsules from said supply hopper in such a manner that the axes of the capsules are aligned with the radial direction of said rotary drum and such that it can be spatially identified whether the capsules are stably held in said capsule accommodating pockets with the caps thereof radially outwardly orientated in an erect posture or radially inwardly orientated in an inverted posture through action of rotary brush means rotatably provided in a position adjacent to a portion of said rotary drum where the capsules are received onto said rotary drum from said supply hopper, and causing the capsules in said inverted posture to fall down in a direction in which the axes of said capsules intersect at right angles with the direction of the transportation of said capsules within said capsule accommodating pockets during the transportation thereof, individually passing from said rotary drum on to a transfer roller, the capsules in an erect posture and those once in the inverted posture and now in a posture of having fallen down in the direction intersecting at right angles with the direction of transportation of said capsules, with the transfer roller being supported adjacent said rotary drum for rotation in the opposite direction with respect to the rotational direction of said rotary drum and having a plurality of radially inwardly extending capsule receiving pockets which are spaced from each other at equal intervals around the periphery of said transfer roller for accommodating therein said capsules in said postures so as to transport said capsules in the circumferential direction of the transfer roller through rotation of said transfer roller, causing the capsules once in the erect posture and now in a inverted posture to fall down for alignment with the orientation of the capsules which have already fallen down, within said capsule receiving pockets of said transfer roller during transportation of said capsules, and remaining from said transfer roller, the respective capsules in the posture intersecting at right angles with the direction of the transportation thereof.

Moreover, according to further preferred embodiments of the present invention, the capsule orientation control method further includes the steps of holding the capsules received from said supply hopper into said capsule accommodating pockets of said rotary drum in the inverted posture so that part of said bodies of said capsules extend outwardly from the periphery of said rotary drum for discrimination of the capsules in the inverted posture from the capsules in the erect posture through difference in height of the capsules extending outwardly from the periphery of said rotary drum, and also causing said capsules in the inverted posture in the respective pockets to fall down in the direction intersecting at right angles with the direction of the transportation thereof through the transporting functioning of said capsules due to rotation of said rotary drum and transfer roller.

The second invention according to the present invention relates to a capsule orientation control apparatus for effecting the capsule orientation control method as described above in a very efficient manner.

Referring now to the drawings, there is shown in FIG. 1 the capsule orientation control apparatus C which generally includes:

a supply hopper 3 for accommodating therein the capsules in any arbitrary posture and having an opening 31 at the bottom portion thereof, a rotary drum 1 rotatably supported below the opening 31 at the bottom portion of the supply hopper 3 for rotation in one direction and having a plurality of radially inwardly extending capsule accommodating pockets 11 which are spaced from each other at equal intervals around the periphery of the rotary drum 1, with the capsule accommodating pockets 11 being arranged to receive and hold the capsules from the supply hopper 3 in such a manner that the axes of the capsules are aligned with the radial direction of the rotary drum 1 and that it can be visually and spatially identified whether the capsules are stably held in the capsule accommodating pockets 11 with the caps thereof radially outwardly orientated in an erect posture or radially inwardly orientated in an inverted posture, rotary brush means 4 provided in a position adjacent to a portion of the rotary drum 1 where the capsules are received onto the rotary drum 1 from the supply hopper 3 for positively accommodating the capsules into the capsule accommodating pockets 11 and for preventing clogging of the capsules, a transfer roller 2 capable of individually receiving from the rotary drum 1, the capsules in an inverted posture and in the posture having fallen down in the direction intersecting at right angles with the direction of transportation of the capsules, with the transfer roller 2 being supported adjacent the rotary drum 1 for rotation in the opposite direction with respect to the rotational direction of the rotary drum 1 and having a plurality of radially inwardly extending capsule receiving pockets 21 which are spaced from each other at equal intervals around the periphery of the transfer roller 2 for accommodating therein the capsules in said postures so as to transport the capsules in the circumferential direction of the transfer roller 2, and attitude altering means (to be mentioned more in detail later) capable of forcibly causing the capsules in the inverted posture in the respective pockets to fall down in the direction intersecting at right angles with the direction of the transportation thereof in the course of the transportation of said capsules following rotation of the rotary drum 1 and transfer roller 2.

Figure 2:
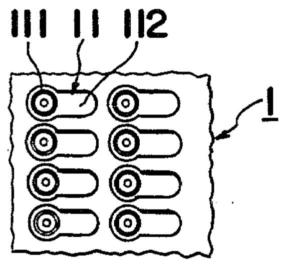
Figure 3:
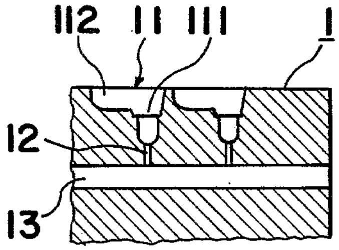

The rotary drum 1 is arranged to be rotated in the direction of the arrow in FIG. 1 by a motor or the like (not shown), while each of the capsule accommodating pockets 11 thereof includes a vertical direction pocket portion 111 (FIGS. 2 and 3) having an upper inner diameter larger than the outer diameter of the cap of the capsule to be controlled for the orientation, and a lower inner diameter smaller than an outer diameter of the cap and larger than an outer diameter of the body of the capsule, with a depth of the large diameter opening at the uppermost portion of said vertical pocket portion being smaller or shallower than the entire length of said capsule for holding the capsule, and with the axis of said capsule being aligned with the radial direction of said rotary drum, and also in said erect and inverted postures, and a lateral direction pocket portion 112 (FIGS. 2 and 5) having a depth approximately equal to the outer diameter of said cap and capable of holding, in cooperation with said vertical pocket portion 111, the capsule in the posture intersecting at right angles with the direction of transportation of said capsule i.e. the circumferential direction of the rotary drum 1 and having fallen down along the axis of said rotary drum 1. The vertical direction pocket portion 111 and lateral direction pocket portion 112 are integrally formed to constitute said capsule accommodating pocket 11. The upper opening portion of the vertical direction pocket portion 111 should preferably be tapered towards the outer periphery of the rotary drum 1 as shown for facilitating the receipt of the capsule.

At the bottom portion of each of the vertical direction pocket portion 111, there is formed an air vent 12 of a small diameter in the radial direction of the rotary drum 1, and the air vent 12 is further communicated with an air passage 13 provided in the axial direction of the rotary drum 1 so as to be opened at the side portion of the drum 1. The air passage 13 is thus communicated with the respective air vents 12 for the capsule accommodating pockets 11 in the same row along the axis of the rotary drum 1, and is arranged to be pneumatically connected with a suction shoe 14 and a compressed air shoe 15 (shown by dotted lines in FIG. 1) opened at one side of the rotary drum 1 to confront each other. Therefore, the air passage 13 corresponds in number to the capsule accommodating pockets 11 in the circumferential direction of the rotary drum 1.

It is to be noted here that, in the suction shoe 14 and compressed air shoe 15 which are opened towards the one side of the rotary drum 1 as described above, the range of opening thereof with respect to the rotary drum 1 is particularly important. More specifically, the suction shoe 14 located at the one side of the rotary drum 1 is opened in the range from an angular position of about 30 to 40 degrees before the pockets 11 are directed to open upwards, to an angular position where said pockets 11 are directed to open approximately horizontally through rotation of the rotary drum 1 in the direction of the arrow in FIG. 1, i.e. in the range from the angular position where the particular pockets 11 reach the supply opening 31 of the supply hopper 3 to start receiving the capsules into said pockets 11, to the angular position where the capsules (in the inverted posture) accommodated in the pockets 11 start to be subjected to the function of the attitude altering means (to be mentioned later) through rotation of the rotary drum 1. Accordingly, since the suction shoe 14 is communicated with all of the air passages 13 located therebetween, during passing of the respective air passages 13 through the range of the opening of the suction shoe 14, said suction shoe 14 draw in the air in the interior of all the corresponding pockets 11 through the air vents 12 for assisting in the receipt of the capsules and also for stably holding said capsules within said pockets 11.

Meanwhile, the compressed air shoe 15 is located at one side of the rotary drum 1 in the similar manner as in the suction shoe 14 and opened for communication with the air passages 13 through a range of angular position which is sufficient for passing the capsules in the pockets 11 of the rotary drum 1 on to the transfer roller 2 (mentioned in detail later) after the capsules in the inverted posture have been subjected to the forcible attitude alteration by the attitude altering means and have reached the vicinity of an angular position where they are relieved from the restriction of said attitude altering means, i.e. after the pockets 11 have reached the vicinity of the lowest angular position of the rotary drum 1 through further advance by a predetermined distance in the direction of the arrow from the terminating point of the opening of said suction shoe 14.

Figure 4:
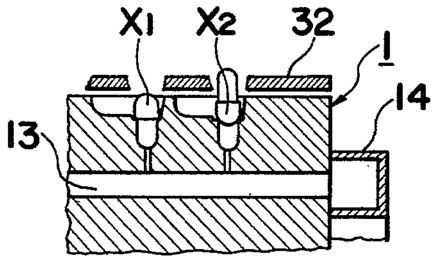

Meanwhile, the hopper 3 provided at the upper part of the rotary drum 1 has its supply opening 31 opened above the outer peripheral surface of the rotary drum 1 over a range from a position adjacent to approximately the highest position of the rotary drum 1 to a position before said highest position by about 30 to 40 degrees. Therefore, the capsules Xo to be controlled for orientation accommodated at random in the supply hopper 3 are individually and successively received and held in the respective pockets 11 through their weight and the suction from said pockets 11, while said pockets 11 are passing under the opening 31 of the hopper 3 through rotation of the rotary drum 1. In the above case, each of the capsules Xo is first received in the vertical direction pocket portion 111 in the erect or inverted posture with the axis thereof aligned with the radial direction of the rotary drum 1. The capsules X1 in the erect posture are completely accommodated within the vertical direction pocket portions 111 as shown in FIG. 4, whereas the capsules X2 in the inverted posture are held therein, with the body sides thereof extending above the outer periphery of the rotary drum 1 for being transported as they are in the circumferential direction of the drum 1 through rotation thereof, since the caps of the capsules X2 can not sufficiently go into the bottom portions of the vertical direction pocket portions 111 due to the difference of the inner diameters at the interior of said pockets.

The supply hopper 3 is provided, in the interior thereof, with guide plates 32 disposed to correspond in positions to the portions between the rows of the respective capsule accommodating pockets 11 along the circumferential direction of said rotary drum 1, while a proper vibration is imparted by a vibrator (not shown) provided together with the above guide plates 32 for preventing bridge formation by the capsules Xo in the similar manner as in the conventional arrangements of the kind.

Figure 5:
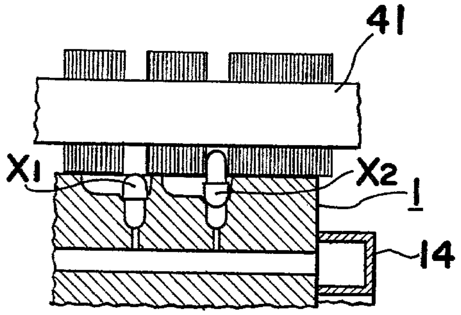

The rotary brush means 4 is provided at the capsule receiving portion of the rotary drum 1, i.e. in a position immediately after the supply hopper 3 with respect to the rotational direction of the rotary drum 1, and in the embodiment of FIG. 1, the rotary brush means 4 includes a pair of spaced rotary brushes 41 and 42 provided in a front and rear relation with respect to said rotational direction of the rotary drum 1. In connection with the above, the arrangement in which one rotary brush similar to the above is provided to rotate in the same direction as the rotary drum for dealing with the capsules from the hopper so as to achieve positive supply of the capsules into the pockets and also to prevent clogging of the capsules with respect to the rotary drum by returning the capsules overflowing from the pockets back to the hopper side, is also disclosed in Japanese Patent Publication Tokkosho No. 53-12,239 mentioned earlier, and thus, may be regarded as conventional. It should be noted here, however, that the rotary brush means 4 according to the apparatus of the present invention is composed of the pair of rotary brushes 41 and 42 provided in the front and rear relation with respect to the rotational direction of the rotary drum 1, with the rear side rotary brush 41 having the effect approximately similar to the known rotary brush. Although the prior art rotary brush is so disposed as to lightly contact with the caps or bodies of the capsules at the tips of the brush bristles thereof, the rotary brush 41 of the present invention is arranged to lightly hold, at the sides thereof, one side or both sides of the wall of the capsules (i.e. the capsules X2 in the inverted posture) as shown in FIG. 5, thus differing from the known structure to a certain extent. Therefore, in the rotary brush 41 of the present invention, the bristles thereof filled at its portion confronting the capsule accommodating pockets 11 of the rotary drum 1, especially facing the vertical direction pocket portions 111 of the pockets 11 may be dispensed with, while in the order portions, the tips of the rotary brush 41 are arranged to lightly contact the outer peripheral surface of the rotary drum 1. The above arrangement of the rotary brush 41 of the present invention is required because, in the capsule orientation control apparatus C of the present invention, since the capsules X2 accommodated in the inverted posture in the capsule accommodating pockets 11 extend above the outer periphery of the rotary drum 1 at the ends of the body sides thereof, there is a possibility that the capsules X2 in the inverted posture are undesirably removed from the pockets 11, if the ends of all the capsules including the capsules in the erect posture, are rubbed by the tips of the brush as in the conventional arrangement.

Figure 6:
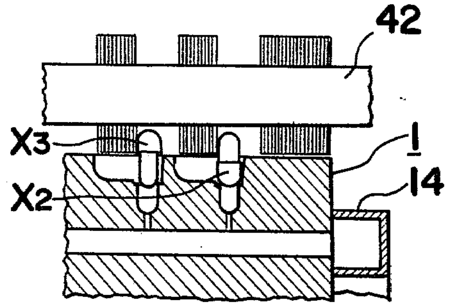

Meanwhile, the other rotary brush 42 provided in the front side with respect to the rotational direction of the rotary drum 1 constitutes one of the features of the arrangement according to the present invention, although generally similar in construction to the rotary brush 41 except that it is adapted to rotate in the direction opposite to that of the rotary drum 1. The above rotary brush 42 has for its object to stably accommodate into the pockets 11, the capsules X3 which are not perfectly held in the vertical direction pocket portions 111, for example, due to catching of the capsules on the inner walls of the pockets 11, etc. as shown in FIG. 1 and FIG. 6. Therefore, the contact force of the rotary brush 42 with respect to the capsules may be weaker than that of the rotary brush 41 mentioned earlier, and for the above reason, it is preferable to arrange that one side face of the rotary brush 42 contacts one side of the wall of each of the capsules, and frictional contact thereof with the capsules to an extent more than necessary should be avoided, since it will result in undesirably removing the capsules X2 in the inverted posture from the pockets 11 in the similar manner as in the case mentioned earlier.

By the synergistic effect of the two rotary brushes 41 and 42 as described above, the capsules are positively held in the respective capsule accommodating pockets 11, and thus, not only the replenishing rate of the capsules to the pockets 11 is markedly improved, but the smooth operation of the apparatus becomes possible, since the clogging or the like of the capsules are simultaneously prevented.

In the manner as described in the foregoing, in the vertical direction pocket portion 111 of each of the pockets 11 of the rotary drum 1, the capsules are accommodated in the erect posture (X1) or in the inverted posture (X2) with their axes aligned with the radial direction of the rotary drum 1, and transported in the circumferential direction of the drum 1 following rotation of said rotary drum 1 in the direction of the arrow in FIG. 1.

Subsequently, at the point in time where the capsule accommodating pockets 11 have been shifted up to the position where they are open in the horizontal direction towards the right side in FIG. 1, the capsules X2 in said inverted posture are subjected to an initial attitude correction by a first attitude altering mechanism of the attitude altering means mentioned hereinbelow.

Figure 7:
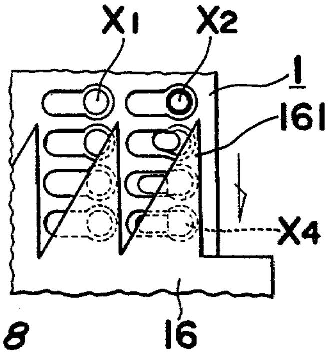

The first attitude altering mechanism mentioned above includes a stopper plate or an obstacle plate 16 provided above and adjacent to the outer peripheral surface of the rotary drum 1 with a predetermined space therebetween in a position at the lower right portion of the drum 1 in FIG. 1. The obstacle plate 16 has engaging portions or edges 161 for the capsules formed by cutting the plate 16 at an angle with respect to the direction of transportation of the capsules (i.e. the circumferential direction of the rotary drum 1) into the shape as in saw-teeth on the whole as shown in FIG. 7, and corresponding in number to the number of rows of the capsule accommodating pockets 11. More specifically, the obstacle plate 16 as described above is spaced from the outer periphery of the rotary drum by such a distance that will permit the capsules X1 in the erect posture to pass therethrough, but will not allow the capsules X2 in the inverted posture to pass therethrough as they are, so that the body sides of said capsules X2 collide with said plate 16 as the capsules are transported. As shown in FIG. 7, the engaging edges 161 of the plate 16 with respect to the capsules are each arranged to intersect, at a comparatively obtuse angle, the direction of transportation of the capsules, in such a manner as if the opening portions of the pockets 11 were successively levelled off by said obstacle plate 16 through rotation of the rotary drum 1.

Accordingly, the capsules X1 in the erect posture transported up to the position of the obstacle plate 16 as the rotary drum 1 rotates, pass under the plate 16 as they do not need correction for their attitude as described above. Meanwhile, the capsules X2, although once prevented from passing due to collision of their body sides with the plate 16, are gradually pushed in the lateral direction (i.e. towards the left in FIG. 7) by the action of the engaging edges 161 through continuous rotation of the rotary drum 1, and at the time point where the capsules X2 have been transported close to the end portions of said engaging edges 161, they are finally caused to lie down completely.

The suction shoe 14 described earlier is arranged to be cut off in its communication with the capsule accommodating pockets 11 at approximately the same time as the capsules accommodated in the pockets 11 have reached the position of the obstacle plate 16 and the capsules X2 in the inverted posture begin to be subjected to the attitude correction by the plate 16, or more preferably, slightly later than the above point in time so as to prevent inconveniences such as "jumping out" by the capsules due to collision of the capsules with the plate 16. Moreover, falling off of the capsules after interruption of the communication of the suction shoe 14 with the pockets 11 is prevented by an extended curved surface of said obstacle plate 16 as is seen from FIG. 1.

In the manner as described in the foregoing, the capsules X2 in the inverted posture are forcibly caused to fall down within the pockets 11 by the transporting function of the rotary drum 1 and the presence of the obstacle plate 16, and after having been corrected for their attitude into the posture X4 in which the axes thereof intersect at right angles with the direction of the transportation of said capsules and have fallen down in the axial direction of the rotary drum 1, said capsules are passed onto the transfer roller 2 in the subsequent stage at the point in time where they have passed a terminal end 162 (FIG. 1) of said obstacle plate 16. Meanwhile, since the capsules X1 of the erect posture are transported in the state as they are, said capsules X1 are passed onto the transfer roller 2 at the subsequent stage in an inverted posture Y2 at the time point where they are released from the restriction by said plate 16.

It is advantageous to effect the transfer of the capsules onto the transfer roller 2 as described above at the lowest angular position of the rotary drum 1. In the above arrangement, it is not necessarily required to provide the forcible capsule ejecting means by compressed air or the like owing to the action of gravity, but if it is intended to effect the capsule transfer more positively and quickly, the compressed air shoes 15 should preferably be provided at the transfer position of the capsules for permitting the feeding of the compressed air to the capsule accommodating pockets 11.

The transfer roller 2 is intended to individually and continuously receive the capsules from the rotary drum 1 for transporting said capsules in the circumferential direction of said transfer roller, the capsules in the inverted posture being subjected to the attitude correction during said transportation, and is driven by the same driving means (not shown) for the rotary drum 1 or exclusive driving means separately provided for rotation in the direction of the arrow in FIG. 1 in synchronization with the rotation of the rotary drum 1. In the embodiment of FIG. 1, since the size of the transfer roller 2 is set to be $\frac{1}{2}$ that of the rotary drum 1, said transfer roller 2 is adjusted to rotate in synchronization with the drum 1 at a speed two times that of said rotary drum 1 during operation.

Figure 8:
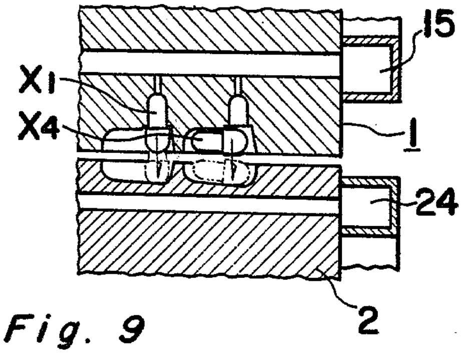

On the outer peripheral surface of the transfer roller 2, there are formed a plurality of radially inwardly extending capsule receiving pockets 21 which correspond to the capsule accommodating pockets 11 of the rotary drum 1 and which are spaced from each other at equal intervals around the peripheral surface of said transfer roller 2. In the pockets 21 as described above, the capsules from the rotary drum 1 are received in an inverted posture or in the posture having fallen down in a direction intersecting at right angles with the direction of transportation thereof. More specifically, as is clear from FIG. 1 and FIG. 8, at the capsule transfer portion of the rotary drum 1, the capsules X1 in the erect posture are automatically received in the pockets 21 of the transfer roller 2 in an inverted posture Y2, while the capsules X4 in the posture having fallen down in the direction intersecting at right angles with the transfer direction thereof are also transferred into said pockets 21 in the state as they are for further being transported in the circumferential direction thereof following rotation of said transfer roller 2. The capsules Y2 transferred onto the transfer roller 2 in the inverted posture as described above are transported with the container sides thereof extending out of the outer peripheral surface of the transfer roller 2 in the similar manner as in the capsule X2 in the inverted posture on the rotary drum 1.

Therefore, the capsule receiving pockets 21 of the transfer roller 2 are capable of holding the capsules Y2 in the inverted posture and the capsules X4 having fallen down in the direction intersecting at right angles with the transporting direction in such a manner that they can be discriminated from each other visually or spatically, and may be of any recesses or the like that can accommodate the capsules to be controlled for the orientation in the posture in which the axes of said capsules intersect at right angles with the circumferential direction of said transfer roller 2 and lie down in the axial direction of said roller 2. Needless to say, at the bottom portion of each of the pockets 21, an air vent 22 and an air passage 23 are provided in the similar manner as in the rotary drum 1 earlier mentioned, so that the interior of said pocket 21 is kept in the state for sucking in the air by the connection thereof with the suction shoe 24 over a range from an angular position where each of the pockets 21 is directed to open approximately upwardly to an angular position where the capsules in the respective pockets 21 begin to be subjected to the attitude correction by a second attitude altering mechanism to be mentioned hereinbelow.

Figure 9:
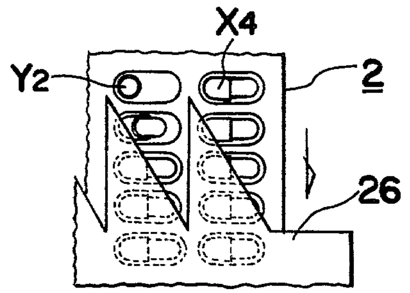

In the similar manner as in the first attitude altering mechanism mentioned earlier, the second attitude altering mechanism also includes an obstacle plate 26 provided adjacent to the outer peripheral surface of the transfer roller 2. The configuration and disposition with respect to the roller 2, function, effects, etc. of the obstacle plate 26 are generally similar to those of the obstacle plate 16 with respect to the rotary drum 1 as is seen from FIG. 1 and FIG. 9. More specifically, the capsules X4 transferred from the rotary drum 1 onto the transfer roller 2 in the posture of falling down are transported in the circumferential direction following rotation of the transfer roller 2 without being subjected to the restriction by the obstacle plate 26, while the capsules Y2 (i.e. the capsules X1 which were in the erect posture in the pockets 11 of the rotary drum 1) transferred from the rotary drum 1 onto the transfer roller 2 in the inverted posture are caused to fall down by the obstacle plate 26 in the similar manner as described earlier with reference to the rotary drum 1 when they have been transported up to the position of said plate 26, and thus, corrected in their attitude into exactly the same state as the capsules X4 which have already been caused to fall down by the obstacle plate 16. As a result, at the point in time where the capsules within each of the pockets 21 have passed the portion of said obstacle plate 26, all the capsules X5 are corrected in their posture into the state where the axes thereof have fallen down to intersect at right angles with the direction of transportation, with the cap sides of said capsules directed in the predetermined direction, and thus, can be taken out as they are in the aligned state from the transfer roller 2.

For taking out the capsules from the transfer roller 2, it is a general practice to utilize the gravity for spontaneous dropping of the capsules at a position in the vicinity of the lowest angular position of said transfer roller 2, but needless to say, a forcible taking out, for example, by a compressed air system may be employed, although not particularly shown. The adoption of the compressed air means as described above not only makes it possible to take out the capsules more quickly, but allows the taking out position from the transfer roller 2 to be suitably altered.

The capsules X5 controlled for the orientation thereof and taken out from the transfer roller 2 in the manner as described above are normally individually distributed into recesses 51 formed in an endless belt 5 referred to as a slat as shown at the lower portion of FIG. 1 and movably provided for movement in the direction of the arrow below and adjacent to the transfer roller 2, and are further transported in the horizontal direction by the movement of said belt 5 for being supplied to subsequent processes such as the printing process, appearance examination process and/or packing process, etc. In connection with the above, the "spin" printing to these capsules may be readily effected by bringing the capsules into contact with a printing roller (not shown) rotating at a higher speed than the speed of transportation of the capsules while said capsules are held on the slat 5 so as to be rotatable on their axes, although such a printing system itself is conventional.

In the capsule orientation control apparatus having the construction, function and effects as described in the foregoing, for still more positive supply of the capsules to the rotary drum 1, with a further improvement of the replenishing rate thereof, there may be considered various modifications, for example, replacing the supply hopper with a capsule feeding device of a vertically moving magazine type, provision of an exclusive capsule supplying drum, etc., although not particularly shown.

The advantages of the capsule orientation control apparatus according to the present invention will be summarized hereinbelow.

(i) In the capsule orientation control apparatus according to the present invention, since the capsule accommodating pockets on the rotary drum are each constituted by the recesses extending in two directions, i.e. the vertical direction pocket portion and lateral direction pocket portion, the larger number of the pockets can be formed per unit area in the outer periphery of the rotary drum than in the known arrangement of Japanese Patent Publication Tokkosho No. 53-12,239 mentioned earlier, with consequent marked improvements of the capsule treating capacity of the apparatus.

(ii) Owing to the arrangement in which the capsule attitude correction is directly effected by the obstacle plates through utilization of the rotary drum (and transfer roller), the apparatus of the present invention provides positive function and effects, and is fully adaptable for a high speed operation in terms of the mechanism thereof.

(iii) According to the present invention, since the obstacle plates are substantially sufficient for the purpose as the arrangement for the capsule attitude correction, the construction of the apparatus itself can be extremely simplified.

(iv) As a result of the above features, the apparatus of the present invention, although simple in the structure, can provide a capsule orientation control apparatus extremely superior in performance.

Hereinbelow, modifications of the capsule orientation control method and apparatus employed therefor of FIGS. 1 to 9 will be described with reference to FIGS. 10 to 13 for the modified apparatus.

Firstly, it is to be noted that the modified capsule orientation control method to be described hereinbelow differs from the method in the embodiment of FIGS. 1 to 9 in that the capsules in the inverted posture within the pockets of the rotary drum are caused to fall down in a direction in which the axes of said capsules are in parallel to or lie along the direction of transportation thereof instead of being caused to fall down in the direction in which the axes thereof intersect at right angles with said direction of transportation.

More specifically, according to the above modification of the present invention, there is provided a modified method of controlling orientation of the plurality of capsules accommodated in any arbitrary posture in the supply hopper having its bottom portion opened, and each composed of a substantially cylindrical body and a substantially cylindrical cap which is mounted on the body so as to overlap one end portion of the body to define a capsule chamber, by causing said capsules to be individually and successively received in the plurality of radially inwardly extending capsule accommodating pockets which are formed in the rotary drum supported substantially below said bottom portion of said supply hopper for rotation in one direction and which are spaced from each other at equal intervals around the periphery of said rotary drum so as to transport the capsules accommodated in said pockets through rotation of the rotary drum in a circumferential direction of said rotary drum for directing the capsules in a predetermined posture during the transportation thereof. The modified method includes the steps of:

receiving and holding the capsules from said supply hopper in such a manner that axes of the capsules are aligned with the radial direction of said rotary drum and that it can be visually and spatially identified whether the capsules are stably held in said capsule accommodating pockets with the caps thereof selectively radially outwardly orientated in the erect posture or radially inwardly orientated in the inverted posture through action of the rotary brush means rotatably provided in the position adjacent to the portion of said rotary drum where the capsules are received onto said rotary drum from said supply hopper, causing the capsules in said inverted posture to fall down in a direction in which the axes of said capsules lie along the direction of the transportation of said capsules within the pockets during the transportation thereof, and taking out said capsules which have fallen down after substantially having aligned positions of the caps thereof with positions of the caps of the capsules in said erect posture.

The modified capsule orientation control method as described above further includes the step of holding the capsules received from said supply hopper into said capsule accommodating pockets of said rotary drum in the inverted posture so that part of said bodies of said capsules extend outwardly from the periphery of said rotary drum for discrimination of the capsules in the inverted posture from the capsules in the erect posture through difference in height of the capsules extending outwardly from the periphery of said rotary drum, and the step in which the capsules in the inverted posture in the respective pockets are caused to collide with the stopper plate or obstacle plate so that said capsules fall down within said pockets in a direction in which the axes thereof lie along the direction of transportation of said capsules through the transporting function of the capsules following rotation of said rotary drum.

Meanwhile, the modified capsule orientation control apparatus CB for effecting the above capsule orientation control method and to be described hereinbelow with reference to FIGS. 10 to 13 generally includes:

the supply hopper 3 for accommodating therein the capsules in any arbitrary posture and having the opening 31 at the bottom portion thereof, a modified rotary drum 1B rotatably supported below the opening at the bottom portion of said supply hopper 3 for rotation in one direction and having a plurality of radially inwardly extending capsule accommodating pockets 11B which are spaced from each other at equal intervals around the periphery of said rotary drum 1B, with the capsule accommodating pockets 11B being arranged to receive and hold the capsules from said supply hopper 3 in such a manner that axes of the capsules are aligned with the radial direction of said rotary drum 1B and that it can be visually and spatially identified whether the capsule are stably held in said capsule accommodating pockets 11B with the cap thereof selectively radially outwardly orientated in the erect posture or radially inwardly orientated in the inverted posture, the rotary brush means 4 provided in the position adjacent to the portion of said rotary drum 1B where the capsules are received onto said rotary drum 1B from said supply hopper 3 for positively accommodating said capsules into said capsule accommodating pockets 11B and for preventing clogging of the capsules, and attitude altering means capable of forcibly causing the capsules in the inverted posture in the respective pockets to fall down in the direction in which the axes thereof lie along the direction of the transportation thereof in the course of transportation of the capsules through rotation of said rotary drum 1B.

Figure 10:
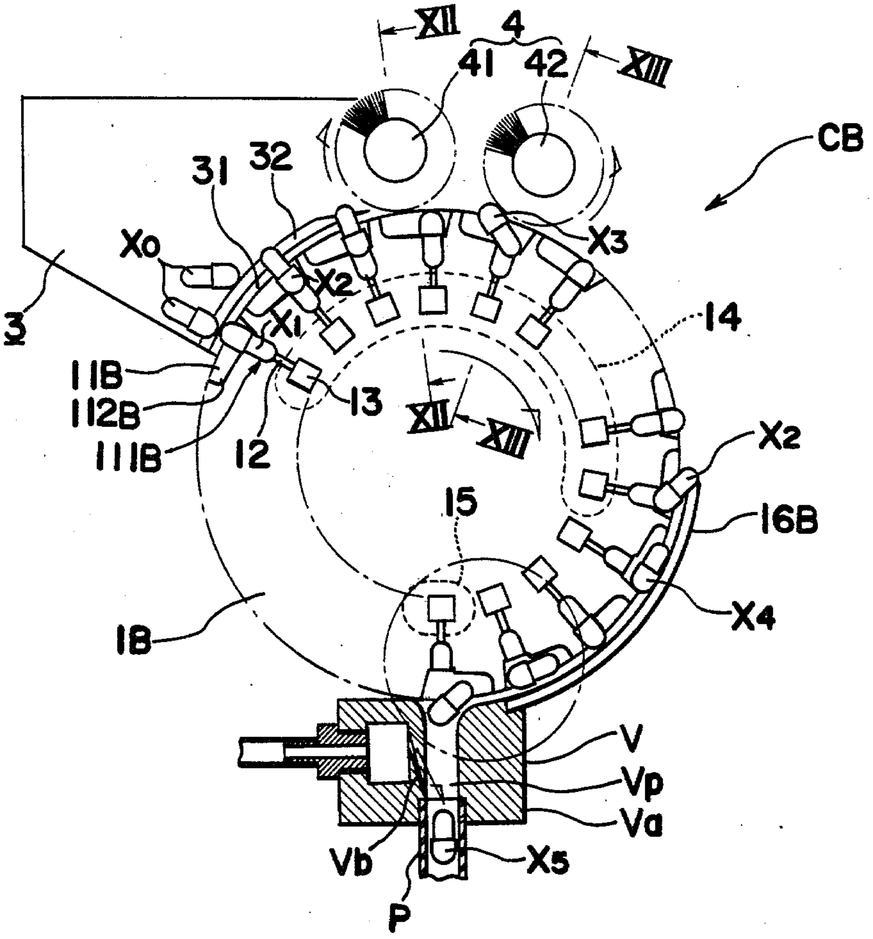

More specifically, in the modified capsule orientation control apparatus CB of FIGS. 10 to 13, the rotary drum 1B has the capsule accommodating pockets 11B, each of which includes a radial direction pocket portion 111B having an upper inner diameter larger than an outer diameter of the cap of the capsule to be controlled for the orientation, and a lower inner diameter smaller than an outer diameter of the cap and larger than an outer diameter of the body of the capsule, with a depth of a large diameter opening at the uppermost portion of said radial direction pocket portion being smaller than the entire length of said capsule for holding the capsule, and with the axis of said capsule being aligned with the radial direction of said rotary drum, and also in said erect and inverted postures, and a circumferential direction pocket portion 112B capable of holding the capsule in the posture in which the axis of said capsule lies along the direction of transportation of said capsule in cooperation with said radial direction pocket portion 111B, with the radial direction pocket portion 111B and circumferential direction pocket portion 112B being integrally formed to constitute said capsule accommodating pocket 11B, while the transfer roller 2 described as employed in the arrangement of FIGS. 1 to 9 has been replaced by a take-out block V which is provided in a position at the lowest angular position of the rotary drum 1B for quickly and positively transferring the orientation-corrected capsules X5 from said rotary drum 1B to the subsequent process (not shown), and which includes a body Va, a capsule passage Vp extending through said body portion Va in the vertical direction in FIG. 10 so as to correspond in position to each of the capsule accommodating pockets 11B upon rotation of the rotary drum 1B, and an air blast bore Vb arranged to open at a side wall portion of said passage Vp for positively drawing in the capsules from the drum 1B and discharging the same towards the subsequent process. The capsules taken out by the take-out block V are led to a predetermined place or process, for example, through a flexible tube P or the like connected to said capsule passage Vp.

In the above arrangement, by the synergistic effect of the two rotary brushes 41 and 42 having the functions with respect to the capsules as described in detail with reference to the embodiment of FIGS. 1 to 9, the capsules, even the capsule X3 which happens to be caught by the inner wall of the pocket 11B, are stably accommodated in the radial direction pocket portion 111B of each of the pockets 11B of the rotary drum 1B in the erect posture (X1) or in the inverted posture (X2) with their axes aligned with the radial direction of the rotary drum (FIGS. 12 and 13), and transported in the circumferential direction of the drum 1B following rotation of said rotary drum 1B in the direction of the arrow in FIG. 10.

Subsequently, at the point in time where the capsule accommodating pockets 11B have been shifted up to the position where they are open in the horizontal direction towards the right in FIG. 10, the capsules X2 in the inverted posture are subjected to the attitude correction by the attitude altering or correction mechanism of the attitude altering means. The attitude altering mechanism mentioned above includes a stopper plate or an obstacle plate 16B which is provided above and adjacent to the outer peripheral surface of the rotary drum 1B to be spaced a predetermined distance therefrom. More specifically, the obstacle plate 16B as described above is spaced from the outer periphery of the rotary drum by such a distance that will permit the capsules X1 in the erect posture to pass therethrough, but will not allow the capsules X2 in the inverted posture to pass therethrough as they are, so that the container sides of said capsules X2 collide with said plate 16B as the capsules are transported.

Accordingly, the capsules X1 in the erect posture transported up to the position of the obstacle plate 16 as the rotary drum 1 rotates, pass under the plate 16 as they are without being corrected for their attitude as described above. Meanwhile, the capsules X2, in the inverted posture, whose body sides are brought into collision with said plate 16B to be prevented from passing as they are, are consequently pushed rearwardly at the body sides thereof so as to be finally completely pushed down within the pockets 11B.

Figure 11:
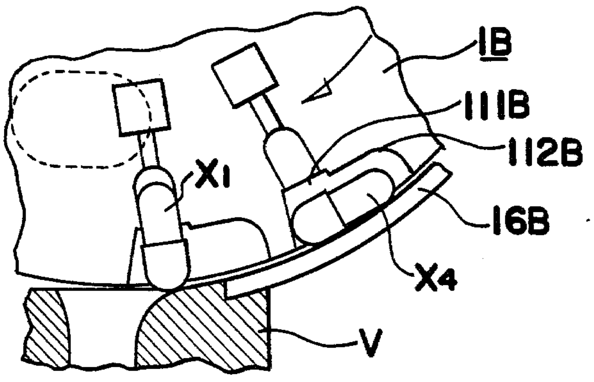
Figure 12:
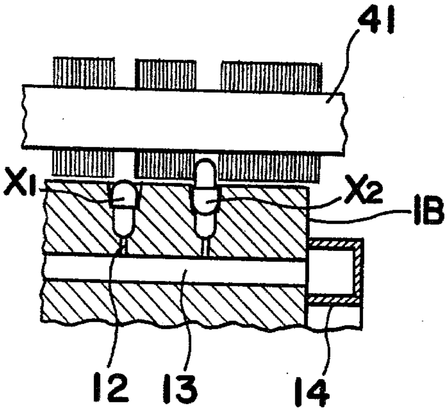
Figure 13:
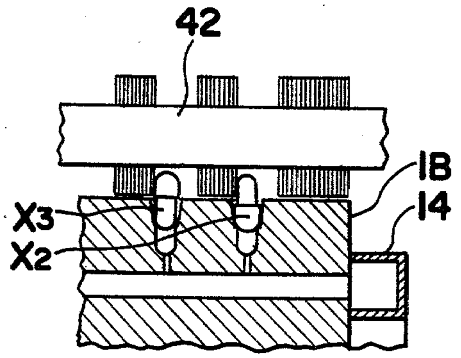

In the manner as described above, the capsules X2 in the inverted posture in the capsule accommodating pockets 11B are forcibly caused to fall down rearwardly within said pockets 11B through transporting function following rotation of the rotary drum 1B and presence of the obstacle plate 16B so as to be accommodated in the circumferential direction pocket portions 112B. In other words, at the above point in time, the capsules X2 in said inverted posture are caused to fall down into the posture X4 in which the axes thereof intersect at right angles with the axis of the rotary drum 1B so as to lie down along the direction of transportation of the capsules, with the cap sides of said capsules being located above the radial direction pocket portions 111B as shown in FIG. 11 for substantial alignment with the positions of the cap sides of the capsules X1 in the erect posture. Accordingly, in the modification of FIG. 10, upon completion of the selective (i.e. only of the capsules in the inverted posture) attitude correction by the obstacle plate 16B, the cap sides of all the capsules (X1 and X4) to be corrected for the orientation are positioned, without fail, above the radial direction pocket portions 111B of the rotary drum 1B, although the directions of the axes thereof are different, and therefore, at the time point where the capsules in the pockets 11B have reached the angular position where they are released from the restriction of the obstacle plate 16 though further transportation thereof by the rotation of the drum 1B, the capsules are successively fed to the subsequent process, with the cap sides thereof directed forwards, for example, through the take-out block V.

In the similar manner as in the transfer of the capsules onto the transfer roller 2 in the embodiment of FIGS. 1 to 9, it is advantageous to effect the transfer of the capsules onto the take-out block V as described above at the lowest angular position of the rotary drum 1B, by which arrangement, it is not necessarily required to provide the forcible capsule ejecting means by compressed air or the like owing to the action of gravity, but if it is required to effect the capsule transfer more positively and quickly, the compressed air shoes 15 should preferably be provided at the transfer position of the capsules for permitting the feeding of the compressed air to the capsule accommodating pockets 11B.

Figure 14:
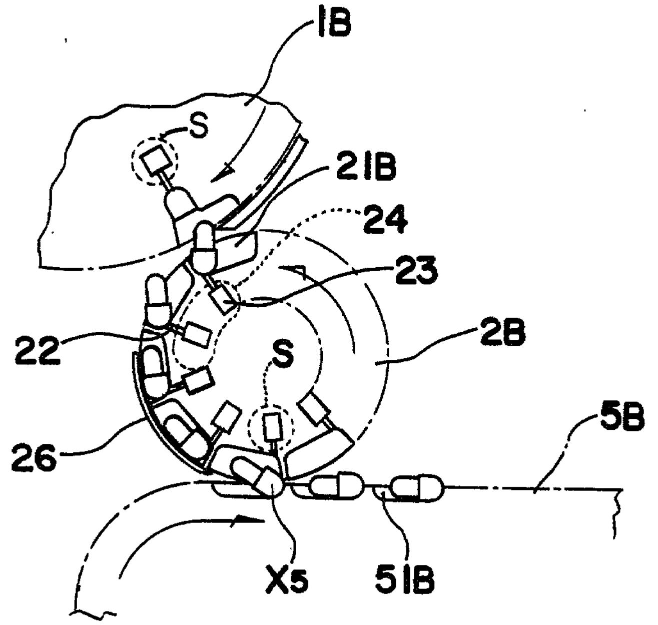

Moreover, the take-up block V described as employed in the above modification may be replaced by the transfer roller 2B as shown in FIG. 14 similar to the transfer roller 2 in the arrangement of FIGS. 1 to 9, but having the modified capsule receiving pockets 21B including the recesses capable of accommodating therein the capsules in the posture in which the axes thereof have fallen down along the circumferential direction of said transfer roller 2B so as to intersect at right angles with the axis of the transfer roller 2B.

The capsules X5 taken out from the transfer roller 2B in the corrected attitude are distributed into the corresponding recesses 51B formed in the endless belt or slat 5B in a direction along the direction of transportation of the capsules as shown in FIG. 14 for further being transported to subsequent processes in the similar manner as in the embodiment of FIGS. 1 to 9.

In the transfer roller 2B as described above, although the capsules are normally taken out through utilization of gravity for spontaneous dropping of the capsules at a position in the vicinity of the lowest angular position of said transfer roller 2B, it is needless to say that forcible take-out means, for example, a compressed air shoe S (FIG. 14) may further be adopted to achieve quicker taking-out of the capsules and suitable alterations of the capsule taking out positions as also mentioned with reference to the arrangement of FIGS. 1 to 9.

Although the modified capsule orientation control method and apparatus employed therefor are intended to align the cap sides of all the capsules to be directed forwards with respect to the direction of transportation of the capsules, there may be a case where it is preferable to align the capsules with the body sides thereof directed forwards as in the case of filling the capsules with contents, and in such a case, the attitude of the capsules can be readily reversed by providing, between the rotary drum 1B and transfer roller 2B or immediately after the transfer roller 2B, another roller (not shown) similar to said transfer roller 2B.

Since other constructions, functions and effects of the modified capsule orientation control arrangements of FIGS. 10 to 14 are similar to those of the arrangement of FIGS. 1 to 9, detailed description thereof is abbreviated here for brevity.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A method of controlling orientation of a plurality of capsules accommodated in any arbitrary posture in a supply hopper having its bottom portion opened, and each composed of a substantially cylindrical body and a substantially cylindrical cap which is mounted on the body so as to overlap one end portion of said body to define a capsule chamber, by causing said capsules to be individually and successfully received in a plurality of radially inwardly extending stepped capsule accommodating pockets which are formed in a rotary drum supported substantially below said bottom portion of said supply hopper for rotation in one direction and which are spaced from each other at equal intervals around the periphery of said rotary drum so as to transport the capsules accommodated in said capsule accommodating pockets through rotation of the rotary drum in a circumferential direction of said rotary drum for directing the capsules in a predetermined posture during the transportation thereof, said method comprising the steps of:

receiving and holding the capsules from said supply hopper in such a manner that the axes of the capsules are aligned with the radial direction of said rotary drum such that it can be spatially identified that the capsules are stably held in said capsule accommodating pockets with the caps thereof selectively radially outwardly orientated in an erect posture or radially inwardly orientated in an inverted posture through action of rotary brush means rotatably provided in a position adjacent to a portion of said rotary drum where the capsules are received onto said rotary drum from said supply hopper, wherein part of the bodies of said capsules in the inverted posture extend substantially outwardly from the periphery of said rotary drum due to the stepped nature of said pockets for discrimination of the capsules in the inverted posture from the capsules in the erect posture which are housed entirely within the respective capsule accommodating pockets and causing the capsules in said inverted posture to collide with a first attitude altering stopper plate means so as to fall down within said capsule accommodating pockets in a predetermined direction.

2. A method as claimed in claim 1, wherein said predetermined direction is such that upon falling down, the axes of said capsules intersect at right angles the direction of the transportation of said capsules.

3. A method as claimed in claim 2, further including the steps of:

individually passing from said rotary drum on to a transfer roller, the capsules in the erect posture and those having fallen down in the direction intersecting at right angles with the direction of transportation of said capsules, said transfer roller being supported adjacent said rotary drum for rotation in the opposite direction with respect to the rotational direction of said rotary drum and having a plurality of radially inwardly extending capsule receiving pockets which are spaced from each other at equal intervals around the periphery of said transfer roller for accommodating therein said capsules in said postures so as to transport said capsules in the circumferential direction of the transfer roller through rotation of said transfer roller, causing the once erect capsules in a now inverted posture to collide with a second attitude altering stopper plate means so as to fall down for alignment with the orientation of the capsules which have already fallen down, within said capsule receiving pockets of said transfer roller during transportation of said capsules, and removing from said transfer roller, the respective capsules in a posture intersecting at right angles with the direction of the transportation thereof.

4. A method as claimed in claim 3, wherein said capsules in the inverted posture in the respective pockets are adapted to fall down in the direction intersecting at right angles with the direction of the transportation thereof through the transporting function of said capsules due to rotation of said rotary drum and transfer roller.

5. A method as claimed in claim 1, wherein said predetermined direction is such that upon falling down the axes of said capsules lie along the direction of the transportation of said capsules.

6. A method as claimed in claim 5, further including the step of removing said capsules from said capsule accommodating pockets.

7. A capsule orientation control apparatus for orientating, in a predetermined posture, a plurality of capsules each composed of a cylindrical body and a cylindrical cap which is mounted on the body to overlap one end portion of said body for defining a capsule chamber, said capsule orientation apparatus comprising:

a supply hopper for accommodating therein the capsules in an arbitrary posture and having an opening at the bottom portion thereof, a rotary drum rotatably supported below the opening at the bottom portion of said supply hopper for rotation in one direction and having a plurality of radially inwardly extending stepped capsule accommodating pockets which are spaced from each other at equal intervals around the periphery of said rotary drum, said capsule accommodating pockets being arranged to receive and hold the capsules from said supply hopper in such a manner that the axes of the capsules are aligned with the radial direction of said rotary drum and that it can be spatially identified that the capsules are held in said capsule accommodating pockets with the caps thereof selectively radially outwardly orientated in an erect posture or radially inwardly orientated in an inverted posture, rotary brush means provided in a position adjacent to a portion of said rotary drum where the capsules are received onto said rotary drum from said supply hopper for positively accommodating said capsules into said capsule accommodating pockets and for preventing clogging of the capsules, wherein part of the bodies of said capsules in the inverted posture extend substantially outwardly from the periphery of said rotary drum due to the stepped nature of said pockets for discrimination of the capsules in the inverted posture from the capsules in the erect posture which are housed entirely within the respective capsule accommodating pockets, and a first attitude altering stopper plate means for altering the attitude of said capsules capable of forcibly causing said capsules in the inverted posture to fall down within said capsule accommodating pockets in a predetermined direction.

8. A capsule orientation control apparatus as claimed in claim 7, wherein said attitude altering means is capable of forcibly causing said capsules in the inverted posture to fall down in said predetermined direction in which the axes of said fallen capsules intersect at right angles with the direction of the transportation of said capsules.

9. A capsule orientation control apparatus as claimed in claim 7, further including a transfer roller capable of individually receiving from said rotary drum, the capsules in the erect posture and those in an inverted posture which have fallen down, and a second attitude altering stopper plate means juxtapositioned to the periphery of said transfer roller, said transfer roller being supported adjacent said rotary drum for rotation in the opposite direction with respect to the rotational direction of said rotary drum and having a plurality of radially inwardly extending capsule receiving pockets which are spaced from each other at equal intervals around the periphery of said transfer roller for accommodating therein said capsules in said posture so as to transport said capsules in the circumferential direction of said transfer roller.

10. A capsule orientation control apparatus as claimed in claim 9, wherein said attitude altering means are respectively provided above and adjacent to the outer peripheral surfaces of said rotary drum and transfer roller so as to be spaced a predetermined distance from the corresponding surfaces of said rotary drum and transfer roller.

11. The capsule orientation control apparatus of claim 10 wherein an engaging portion of each of said stopper plates is tapered at an angle with respect to the direction of transportation of said capsules.

12. A capsule orientation control apparatus as claimed in claim 7, wherein said stepped capsule accommodating pockets of said rotary drum each include a vertical direction pocket portion having an upper inner diameter larger than an outer diameter of the cap of the capsule to be controlled for the orientation, and a lower inner diameter smaller than an outer diameter of the cap and larger than an outer diameter of the body of the capsule, with a depth of a large diameter opening at the uppermost portion of said vertical direction pocket portion being smaller than the entire length of said capsule for holding the capsule, with the axis of said capsules being aligned with the radial direction of said rotary drum in said erect and inverted postures of said capsules, and a lateral direction pocket portion capable of holding, in cooperation with said vertical direction pocket portion, the capsule in the fallen posture said vertical direction pocket portion and lateral direction pocket portion being integrally formed to constitute said capsule accommodating pocket.

13. A capsule orientation control apparatus as claimed in claim 7, wherein said rotary brush means comprises a pair of spaced rotary brushes rotatably provided in a front and rear relation with respect to the rotational direction of said rotary drum, said front rotary brush being arranged to rotate in a direction opposite to the rotational direction of the rotary drum, with said rear rotary brush being adapted to rotate in the same direction as the rotational direction of said rotary drum.

14. A capsule orientation control apparatus as claimed in claim 13, wherein said rotary brushes are arranged to contact, at the side portion thereof, one side of the side wall of the body of each of the capsules.

15. A capsule orientation control apparatus as claimed in claim 13, wherein said rotary brushes are arranged to contact, at the side portions thereof, both sides of the side wall of the body of each of the capsules.

16. A capsule orientation control apparatus as claimed in claim 7, wherein said attitude altering means is capable of causing said capsules in the inverted posture to fall down in said predetermined direction in which axes of said capsules lie along the direction of transportation of said capsules during transportation thereof.

17. A capsule orientation control apparatus as claimed in claim 7, wherein said capsule accommodating pockets of said rotary drum each include a radial direction pocket portion having an upper inner diameter larger than an outer diameter of the cap of the capsule to be controlled for the orientation, and a lower inner diameter smaller than an outer diameter of the cap and larger than an outer diameter of the body of the capsule, with a depth of a large diameter opening at the uppermost portion of said radial direction pocket portion being smaller than the entire length of said capsule for holding the capsule, with the axis of said capsule being aligned with the radial direction of said rotary drum, and also in said erect and inverted postures, and a circumferential direction pocket portion capable of holding the capsule in the posture in which the axis of said capsule lies along the direction of transportation of said capsule in cooperation with said radial direction pocket portion, said radial direction pocket portion and circumferential direction pocket portion being integrally formed to constitute said capsule accommodating pocket.

18. The apparatus of claim 7 further including means for assisting in the receipt of the capsules and stably holding the capsules in the respective pockets.

19. The apparatus of claim 18 wherein said means comprises an air suction shoe.

20. The apparatus of claim 7 further including means for removing said capsules from said pockets.

21. The apparatus of claim 20 wherein said means comprises a compressed air shoe.

22. A method of controlling orientation of a plurality of capsules accommodated in any arbitrary posture in a supply hopper having its bottom portion opened, and each composed of a substantially cylindrical body and a substantially cylindrical cap which is mounted on the body so as to overlap one end portion of said body to define a capsule chamber, by causing said capsules to be individually and successively received in a plurality of radially inwardly extending stepped capsule accommodating pockets which are formed in a rotary drum supported substantially below said bottom portion of said supply hopper for rotation in one direction and which are spaced from each other at equal intervals around the periphery of said rotary drum so as to transport the capsules accommodated in said capsule accommodating pockets through rotation of the rotary drum in a circumferential direction of said rotary drum for directing the capsules in a predetermined posture during the transportation thereof, said method comprising the steps of:

receiving and holding the capsules from said supply hopper in such a manner that the axes of the capsules are aligned with the radial direction of said rotary drum and that it can be spatially identified that the capsules are stably held in said capsule accommodating pockets with the caps thereof selectively radially outwardly orientated in an erect posture or radially inwardly orientated in an inverted posture through action of rotary brush means rotatably provided in a position adjacent to a portion of said rotary drum where the capsules are received onto said rotary drum from said supply hopper, wherein part of the bodies of said capsules in the inverted posture extend substantially outwardly from the periphery of said rotary drum due to the stepped nature of said pockets for discrimination of the capsules in the inverted posture from the capsules in the erect posture which are housed entirely within the respective capsule accommodating pockets, and causing the capsules in said inverted posture to collide with a first attitude altering stopper plate means so as to fall down in a direction in which the axes of said capsules intersect at right angles with the direction of the transportation of said capsules within said capsule accommodating pockets during the transportation thereof, individually passing from said rotary drum on to a transfer roller, the capsules in the erect posture and those having fallen down in the direction intersecting at right angles with the direction of transportation of said capsules, said transfer roller being supported adjacent said rotary drum for rotation in the opposite direction with respect to the rotational direction of said rotary drum and having a plurality of radially inwardly extending capsule receiving pockets which are spaced from each other at equal intervals around the periphery of said transfer roller for accommodating therein said capsules in said postures so as to transport said capsules in the circumferential direction of the transfer roller through rotation of said transfer roller, causing the once erect capsules in a now inverted posture to collide with a second attitude altering stopper plate means so as to fall down for alignment with the orientation of the capsules which have already fallen down, within said capsule receiving pockets of said transfer roller during transportation of said capsules, and removing from said transfer roller, the respective capsules in the posture intersecting at right angles with the direction of the transportation thereof.

23. A capsule orientation control apparatus for orientating into a predetermined posture, a plurality of capsules each composed of a cylindrical body and a cylindrical cap which is mounted on the body to overlap one end portion of said body for defining a capsule chamber, said capsule orientation apparatus comprising:

a supply hopper for accommodating therein the capsules in an arbitrary posture and having an opening at the bottom portion thereof, a rotary drum rotatably supported below the opening at the bottom portion of said supply hopper for rotation in one direction and having a plurality of radially inwardly extending stepped capsule accommodating pockets which are spaced from each other at equal intervals around the periphery of said rotary drum, said capsule accommodating pockets being arranged to receive and hold the capsules from said supply hopper in such a manner that the axes of the capsules are aligned with the radial direction of said rotary drum and that it can be spatially identified that the capsules are stably held in said capsule accommodating pockets with the caps thereof selectively radially outwardly orientated in an erect posture or radially inwardly orientated in an inverted posture, said rotary drum being accommodated with a first attitude altering stopper plate means juxtapositioned to the periphery of said rotary drum, a rotary brush means provided in a position adjacent to a portion of said rotary drum where the capsules are received onto said rotary drum from said supply hopper for positively accommodating said capsules into said capsule accommodating pockets and for preventing clogging of the capsules, wherein part of the bodies of said capsules in the inverted posture extend substantially outwardly from the periphery of said rotary drum due to the stepped nature of said pockets for discrimination of the capsules in the inverted posture from the capsules in the erect posture which are housed entirely within the respective capsule accommodating pockets, and a transfer roller capable of individually receiving said capsules from said rotary drum, and a second attitude altering stopper plate means juxtapositioned to the periphery of said transfer roller, said transfer roller being supported adjacent said rotary drum for rotation in the opposite direction with respect to the rotational direction of said rotary drum and having a plurality of radially inwardly extending capsule receiving pockets which are spaced from each other at equal intervals around the periphery of said transfer roller for accommodating therein said capsules in said postures so as to transport said capsules in the circumferential direction of said transfer roller, said first and second attitude altering means capable of forcibly causing the capsules in the inverted posture in the respective pockets of said rotary drum and transfer roller to fall down in the direction intersecting at right angles with the direction of the transportation thereof in the course of the transportation of said capsules following rotation of said rotary drum and transfer roller.

24. A method of controlling orientation of a plurality of capsules accommodated in any arbitrary posture in a supply hopper having its bottom portion opened, and each composed of a substantially cylindrical body and a substantially cylindrical cap which is mounted on the body so as to overlap one end portion of said body to define a capsule chamber, by causing said capsules to be individually and successively received in a plurality of radially inwardly extending stepped capsule accommodating pockets which are formed in a rotary drum supported substantially below said bottom portion of said supply hopper for rotation in one direction and which are spaced from each other at equal intervals around the periphery of said rotary drum so as to transport the capsules accommodated in said pockets through rotation of the rotary drum in a circumferential direction of said rotary drum for directing the capsules in a predetermined posture during the transportation thereof, said method comprising the steps of:

receiving and holding the capsules from said supply hopper in such a manner that the axes of the capsules are aligned with the radial direction of said rotary drum and that it can be spatially identified that the capsules are stably held in said capsule accommodating pockets with the caps thereof selectively radially outwardly orientated in an erect posture or radially inwardly orientated in an inverted posture through action of rotary brush means rotatably provided in a position adjacent to a portion of said rotary drum where the capsules are received onto said rotary drum from said supply hopper, and wherein part of the bodies of said capsules in the inverted posture extend substantially outwardly from the periphery of said rotary drum due to the stepped nature of said pockets for discrimination of the capsules in the inverted posture from the capsules in the erect posture which are housed entirely within the respective capsule accommodating pockets, causing the capsules in said inverted posture to collide with a first attitude altering stopper plate means so as to fall down in a direction in which the axes of said capsules lie along the direction of the transportation of said capsules within the pockets during the transportation thereof, and removing said capsules which have fallen down after substantially having aligned positions of the caps thereof with positions of the caps of the capsules in said erect posture.

25. A capsule orientation control apparatus for orientating, in a predetermined posture, a plurality of capsules each composed of a cylindrical body and a cylindrical cap which is mounted on the body to overlap one end portion of said body for defining a capsule chamber, said capsule orientation apparatus comprising:

a supply hopper for accommodating therein the capsules in any arbitrary posture and having an opening at the bottom portion thereof, a rotary drum rotatably supported below the opening at the bottom portion of said supply hopper for rotation in one direction and having a plurality of radially inwardly extending stepped capsule accommodating pockets which are spaced from each other at equal intervals around the periphery of said rotary drum, said capsule accommodating pockets being arranged to receive and hold the capsules from said supply hopper in such a manner that the axes of the capsules are aligned with the radial direction of said rotary drum and that it can be spatially identified that the capsules are stably held in said capsule accommodating pockets with the cap thereof selectively radially outwardly orientated in an erect posture or radially inwardly orientated in an inverted posture, a rotary brush means provided in a position adjacent to a portion of said rotary drum where the capsules are received onto said rotary drum from said supply hopper for positively accommodating said capsules into said capsule accommodating pockets and preventing clogging of the capsules, wherein part of the bodies of said capsules in the inverted posture extend substantially outwardly from the periphery of said rotary drum due to the stepped nature of said pockets for discrimination of the capsules in the inverted posture from the capsules in the erect posture which are housed entirely within the respective capsule accommodating pockets, and an attitude altering stopper plate means capable of forcibly causing the capsules in the inverted posture in the respective pockets to fall down in the direction in which the axes thereof lie along the direction of the transportation thereof in the course of transportation of the capsules through rotation of said rotary drum.

* * * * *